(12) United States Patent
Yang et al.

(10) Patent No.: US 6,280,784 B1
(45) Date of Patent: Aug. 28, 2001

(54) METHOD FOR RAPIDLY MAKING A 3-D FOOD OBJECT

(75) Inventors: Junsheng Yang; Liangwei Wu; Junhai Liu, all of Auburn, AL (US)

(73) Assignee: Nanotek Instruments, Inc, Opelika, AL (US)

( * ) Notice: Subject to any disclaimer, the term of this patent is extended or adjusted under 35 U.S.C. 154(b) by 0 days.

(21) Appl. No.: 09/501,648

(22) Filed: Feb. 10, 2000

(51) Int. Cl.⁷ ............................... A23P 1/00; B29C 31/00
(52) U.S. Cl. .......................... 426/231; 425/112; 425/375; 426/512
(58) Field of Search .................... 426/231, 512, 426/516; 425/112, 375; 700/118, 119, 196

(56) References Cited

U.S. PATENT DOCUMENTS

| | | |
|---|---|---|
| 4,749,347 | 6/1988 | Valavoora . |
| 5,121,329 | 6/1992 | Crump . |
| 5,134,569 | 7/1992 | Masters . |
| 5,141,680 | 8/1992 | Almquist et al. . |
| 5,204,124 | 4/1993 | Secretan et al. . |
| 5,303,141 | 4/1994 | Batchelder et al. . |
| 5,340,433 | 8/1994 | Crump . |
| 5,402,351 | 3/1995 | Batchelder et al. . |
| 5,503,785 | 4/1996 | Crump et al. . |
| 5,656,230 | 8/1997 | Khoshevis . |
| 5,738,817 | 4/1998 | Danforth et al. . |
| 5,833,914 | * 11/1998 | Kawaguchi ........................ 425/375 |
| 5,866,058 | 2/1999 | Batchelder et al. . |
| 5,900,207 | 5/1999 | Danforth et al. . |
| 5,939,008 | 8/1999 | Com et al. . |
| 5,968,561 | 10/1999 | Batchelder et al. . |
| 6,027,326 | * 2/2000 | Cesarano, III et al. ............. 425/375 |

* cited by examiner

Primary Examiner—George C. Yeung

(57) ABSTRACT

A freeform fabrication method for making a three-dimensional food object from a design created on a computer, including: (a) providing a support member by which the object is supported while being constructed; (b) operating a material dispensing head for dispensing a strand of food composition in a fluent state with this food composition comprising a volatile ingredient; (c) operating a material treatment device disposed near the strand of food composition to at least partially remove the volatile ingredient for causing the food composition to achieve a rigid state in which the food composition is built up in a 3-D shape of the object; and (d) operating control devices for generating control signals in response to coordinates of the design of the object and controlling the position of the dispensing head relative to the support member in response to the control signals to control dispensing of the food composition for constructing the object while supported with the support member. The method optionally includes an additional step of removing the residual volatile ingredient from the resulting 3-D shape or applying a heat treatment to the 3-D shape upon construction of this shape.

37 Claims, 5 Drawing Sheets

METHOD FOR RAPIDLY MAKING A 3-D FOOD OBJECT

FIELD OF THE INVENTION

This invention relates generally to a layer manufacturing method that uses a food composition for producing a complex-shape three-dimensional (3-D) food object, such as a custom-designed birthday cake. Specifically, this food composition contains a volatile ingredient that can be rapidly removed when the food composition is dispensed from a nozzle onto a support member. Removal of a portion of the volatile ingredient makes the dispensed food composition reach a rigid state for facilitating the fabrication of the food object in an essentially point-by-point and layer-by-layer manner.

BACKGROUND OF THE INVENTION

The last decade has witnessed the emergence of a new frontier in the manufacturing technology, commonly referred to as solid free form fabrication (SFF) or layer manufacturing (LM). A LM process typically involves representing a 3-D object with a computer-aided design (CAD) geometry file. The file is then converted to a machine control command and tool path file that serves to drive and control a part-building tool (e.g., an extrusion head) for building parts essentially point-by-point and layer-by-layer. The LM processes were developed primarily for making models, molds and dies, and prototype parts for industry uses. They are capable of producing a freeform solid object directly from a CAD model without part-specific tooling or human intervention. A SFF process also has potential as a cost-effective production process if the number of parts needed at a given time is relatively small. Use of SFF could reduce tool-making time and cost, and provide the opportunity to modify tool design without incurring high costs and lengthy time delays. A SFF process can be used to fabricate certain parts with a complex geometry which otherwise could not be practically made by traditional fabrication approaches such as machining.

Examples of SFF techniques include stereo lithography (SLa), selective laser sintering (SLS), 3-D printing (3-DP), inkjet printing, laminated object manufacturing (LOM), fused deposition modeling (FDM), laser-assisted welding or cladding, shape deposition modeling (SDM), to name a few. In most of these techniques, the fabrication of a 3-D object either requires the utilization of expensive and difficult-to-handle materials or depends upon the operation of heavy, complex and expensive processing equipment. For instance, the photo-curable epoxy resin used in the stereo lithography process can cost up to U.S.$300 per pound. Melting of metallic, ceramic, and glass materials involves a high temperature and could require expensive heating means such as an induction generator or a laser. Thermoplastics also require a moderately high temperature (normally in the range of 140° C. to 380° C.) to reach a low-viscosity state for processing. Most importantly, most of these prior-art techniques can not be used to fabricate edible food items like cakes. All these layer manufacturing techniques require that a layer be solidified to become a solid before another layer is built. Most of these prior-art LM techniques are not capable of fabricating multi-material or multi-color objects.

Other shortcomings of the prior-art SFF techniques are briefly summarized as follows: The FDM process (e.g., U.S. Pat. No. 5,121,329; 1992 to S. S. Crump) operates by employing a heated nozzle to melt and extrude out a material such as nylon, ABS plastic (acrylonitrile-butadiene-styrene) and wax. The build material is supplied into the nozzle in the form of a rod or filament. The filament or rod is introduced into a channel of a nozzle inside which the rod/filament is driven by a motor and associated rollers to move like a piston. The front end, near a nozzle tip, of this piston is heated to become melted; the rear end or solid portion of this piston pushes the melted portion forward to exit through the nozzle tip. The nozzle is translated under the control of a computer system in accordance with previously sliced CAD data to trace out a 3-D object point by point and layer by layer. This process has a drawback that it requires a separate apparatus to pre-shape a build material into a precisely dimensioned rod or filament form. The re-melting of this rod or filament in a FDM nozzle requires additional heating elements placed around or inside the body of the nozzle. Obviously, this process is not capable of fabricating food objects.

Additional FDM-type processes can be found in U.S. Pat. No. 5,503,785 (Apr. 2, 1996) issued to Crump, et al., U.S. Pat. No. 5,866,058 (Feb. 2, 1999) to Batchelder and Crump, U.S. Pat. No. 5,939,008 (Aug. 17, 1999) to Com, et al., U.S. Pat. No. 5,968,561 (Oct. 19, 1999) to Batchelder, et al., U.S. Pat. No. 5,340,433 (Aug. 23, 1994) to Crump, U.S. Pat. No. 5,738,817 (Apr. 14, 1998) to Danforth, et al., and U.S. Pat. No. 5,900,207 (May 4, 1999) to Danforth, et al. In these latter two patents, a FDM process is disclosed to fabricate a ceramic object from a mixture of ceramic particles dispersed in a binder. The mixture is made into a filament or rod form which is fed into a nozzle in which the binder is melted to make the mixture in a fluent paste state. Upon discharge from the nozzle, the binder is solidified to hold the ceramic powder in a desired shape. The binder is later burned off and the remaining ceramic "green" body is subjected to a high temperature sintering treatment to produce a useful ceramic article.

A particularly useful SFF technique is based on extrusion of heat-meltable materials or thermoplastics. In principle, a bulk quantity of materials (thermoplastics and wax) can be melted and directly transferred to a dispensing nozzle for deposition; it does not require the preparation of a raw material to a special shape followed by re-melting. One example of an extrusion-type (but not based on the LM or SFF approach) is given in U.S. Pat. No. 4,749,347 (Jun. 7, 1988) issued to Valavaara. Extrusion-based SFF processes can be found in U.S. Pat. No. 5,141,680 (Aug. 25, 1992) to Almquist and Smalley, U.S. Pat. No. 5,303,141 (Apr. 12, 1994) and U.S. Pat. No. 5,402,351 (Mar. 28, 1995) both to Batchelder, et al., and U.S. Pat. No. 5,656,230 (Aug. 12, 1997) to Khoshevis. In these examples, the starting material is heated to become a melt and then transferred to a dispensing head by using a gear pump, a positive-displacement valve, an air-operated valve, or an extruder. The nozzle also must be heated to maintain the material in the molten state prior to being extruded out for deposition.

Examples of extrusion-based SFF techniques using thermosetting resins are given in U.S. Pat. No. 5,134,569 (Jul. 28, 1992) to Masters and U.S. Pat. No. 5,204,124 (Apr. 20, 1993) to Secretan and Bayless. Both systems require the use of an ultra-violet (UV) beam or other high energy sources to rapidly cure a thermosetting resin. Photo-curable or fast heat-curable resins are known to be expensive and the curing processes have very limited processing windows; curing of these materials has been inconsistent and difficult and the results have not been very repeatable. Obviously, one would not use a thermosetting resin for making a cake.

An extrusion-based SFF process requires the extruded material quickly solidify to become a solid so that it can support its own weight and other layers that are subsequently deposited thereon without experiencing a significant deformation or shape change. This condition can be readily met with heat-meltable or thermoplastic materials by rapidly cooling the dispensed materials below their melting points. In the present invention, a different type of material compositions is used in an extrusion type SFF process in which "rigidization" or partial solidification of the material does not require either a high energy source (like in the case of UV-curable resins) to achieve a solidification state, or a great amount of heat energy to melt the material and then a cooling means to help solidify the material (like in the case of thermoplastics). Instead, the food material composition is formulated to contain a volatile ingredient (such as water and/or alcohol) which acts to make the food composition in a fluent state. This volatile ingredient, when allowed to partially or totally vaporize or escape from the food composition after being dispensed, leaves the food composition in a sufficiently rigid state (but not solidified) so that multiple layers can be stacked together and bonded to one another to form a 3-D shape with a minimal part distortion.

OBJECTS OF THE INVENTION

An object of the present invention is to provide a layer-additive method for fabricating a three-dimensional food object in an essentially layer-by-layer manner.

Another object of the present invention is to provide an improved method that can automatically reproduce a 3-D food object directly from a computer-generated data file representing this object.

Yet another object of the present invention is to provide a method for producing a 3-D food object of an intricate shape without the use of an object-specific tooling or human intervention.

A further object of the present invention is to provide a simple and cost-effective freeform fabrication method for building a 3-D food object without using heavy and expensive equipment.

Still another object of the present invention is to provide a method for producing a multi-color 3-D food object of an intricate shape in an automated fashion.

BRIEF SUMMARY OF THE INVENTION

The above objects are realized by a method which begins with creation of a computer-aided design (also referred to as a drawing, an image, or a geometry representation) of a three-dimensional food object. The method then involves providing a support member by which the object is supported while being constructed. It also involves operating a material dispensing head for dispensing a strand of food composition in a fluent state. This food composition includes a volatile ingredient that helps to make the food composition in a fluent state while still residing in a chamber of the dispensing head. The method further includes operating a material treatment device disposed near the strand of food composition being dispensed for removing at least a portion of the volatile ingredient to cause the food composition to rapidly achieve a rigid state in which the food composition is built up in a 3-D form of this object. The method also includes operating a computer and machine controller for generating control signals in response to coordinates of the design of this object and for controlling the position of the dispensing head relative to the support member in response to the control signals to control dispensing of the food composition to construct the object while being supported with the support member. Specifically, the dispensed food composition is deposited in multiple layers which stack up and adhere to one another to build up the 3-D shape.

Drive means such as servo or stepper motors are provided to selectively move the support member and dispensing head relative to each other in a predetermined pattern along a direction parallel to an X-Y plane defined by first (X) and second (Y) coordinate axes as the food composition is being dispensed to form a layer. After one layer is built, the dispensing head and the support member are moved away from each other by a predetermined layer thickness. The same procedures of moving and dispensing are then repeated to form each successive layer with each layer having its own characteristic shape and dimensions. Such mechanical movements are preferably achieved through drive signals inputted to the drive motors for the support member and the dispensing head from a computer or controller/indexer regulated by a computer. The computer may have a CAD/CAM software to design and create the object to be formed. Specifically, the software is utilized to convert the 3-D shape of an intended object into multiple layer data, which is transmitted as drive signals through a controller to the drive motors. Each individual computer-generated layer can have its own shape and thickness. It is the combination and consolidation of these layers that form a complete 3-D shape of the object.

The food composition is composed of at least one volatile ingredient and a primary object body-building food material (e.g., flour, corn starch, etc.) and, depending upon the intended application, other ingredients such as colorants, sugar, salt, icing cream, butter, margarine, chocolate, cheese, and yeast.

The volatile ingredient serves two purposes in the present SFF method. First, this ingredient is preferably a liquid at room temperature or can be easily heated to become a liquid. It serves as a vehicle or medium in which other ingredients can be dissolved or dispersed to make a fluent solution, paste, or slurry. Such a fluent food composition can be readily dispensed through an orifice of a dispensing head. Second, as soon as the food composition is dispensed, a material treatment device is operated to remove at least a portion of this volatile ingredient. This treatment makes the food composition quickly reach a rigid state in which the material viscosity or relaxation modulus is sufficiently large that this food composition will no longer undergo any significant deformation (shape or dimension change) when other parts of a layer or successive layers are being built.

The volatile ingredients may be selected from a group consisting of water, alcohol, vinegar. Edible ingredients such as water and ethanol are preferred. The primary object body-building material may comprise small pieces or powders of meat, vegetable, fruit, flour, starch, vitamin, sugar, salt, peppers, flavor, supplementary minerals, and combinations thereof. For instance, a water soluble corn starch may be dissolved/dispersed in water to form a solution/slurry which is fluent. Once the solution/slurry is discharged out of a dispensing head, a portion of water may be quickly removed by using a hot air blower (e.g., hair dryer), a ventilation pump, a vacuum pump, or other means. Removal of water allows starch molecules to precipitate out and adhesive to each other through van der Waal forces and/or hydrogen bonds. A much more volatile alcohol may be added to water to make a mixture of two volatile ingredients. Fast removal of alcohol will make the food composition achieve a sufficiently rigid state more quickly.

In the case of a primary body-building food material not soluble in a particular volatile liquid, this body-building material may be dispersed (but not dissolved) in this volatile liquid; e.g., some flour and yeast powder dispersed in water. A third ingredient (such as yam starch) may be added to serve as an adhesive which will glue together the powder particles to help maintain the shape of the 3-D object when water is partially removed. During the object-building process, only a portion of the volatile ingredient needs to be removed immediately provided that the remaining food composition is sufficiently rigid and solid-like. The remaining volatile ingredient may be removed, if necessary, at a later stage after the object is constructed.

In one preferred embodiment, for instance, an extruder or gear pump may be used to deliver a food composition to a dispensing head. A multiple-channel colorant-feeding module is disposed at the nozzle to feed selected food colorants into the food composition-hosting chamber of the dispensing head just before the food composition is discharged. Such an arrangement makes it more responsive to change from one colorant to another on demand. Alternatively, one may use a plurality of dispensing heads with each head set up to dispense a food composition containing a different colorant.

APPLICATIONS AND ADVANTAGES OF THE PRESENT INVENTION

More Versatile and Realistic Rapid Prototyping of Food Products: The present invention provides a simple yet versatile method for rapidly producing a model for a food item. Due to the versatility of this method, a user of this method is free to choose a volatile ingredient and a primary body-building food material from a wide spectrum of compositions. A wide range of body-building food materials may be combined to form a food item with a desired combination of chemical (e.g., taste), physical and aesthetic properties. A model or prototype food item may be designed and made to be similar in both composition and shape to the final food product if mass production of this item is desired. Hence, the prototype can be fully evaluated to verify the taste-function-form of a food item before mass production begins. This could help eliminate the possibility of producing a large number of food objects only to find out that these objects do not meet the requirements.

For Fabrication of Food Objects of Intricate Shape or One-of-a-Kind Items without Using a Mold or Die: The present invention provides a cost-effective food fabrication process. Most of the current food processing techniques are not capable of making food objects of a complex geometry. SFF concepts provide effective approaches to the production of complex shapes without object-specific tooling or human intervention. Cost-effective freeform fabrication techniques will significantly enhance the attractiveness of a food item. This new technology will permit the production of custom designed food objects on demand. For instance, it can be used to fabricate a cake that is designed by a customer. Every birthday cake can have a different and unique (one-of-a-kind) shape, different material ingredients, and/or a different color pattern.

Simple and Less Expensive Fabrication Equipment Design: The presently invented approach makes it possible to have a simple dispensing head design. For instance, polymer melts (including natural polymers) are normally highly viscous and, hence, difficult to pump, extrude, or eject out of a small orifice due to a high capillarity pressure. The incorporation of a volatile liquid ingredient will make it easier to prepare a flowable food composition, normally without a need to heat the nozzle. The nozzle design can be much less complex. No exotic, fancy or complex fluid delivery device is required. This will also make the control and operation of the present SFF system simple and reliable.

These and other advantages of the invention will become readily apparent as one reads through the following description of preferred embodiments and the accompanying drawings.

DESCRIPTION OF THE PREFERRED EMBODIMENTS

Figure 1:
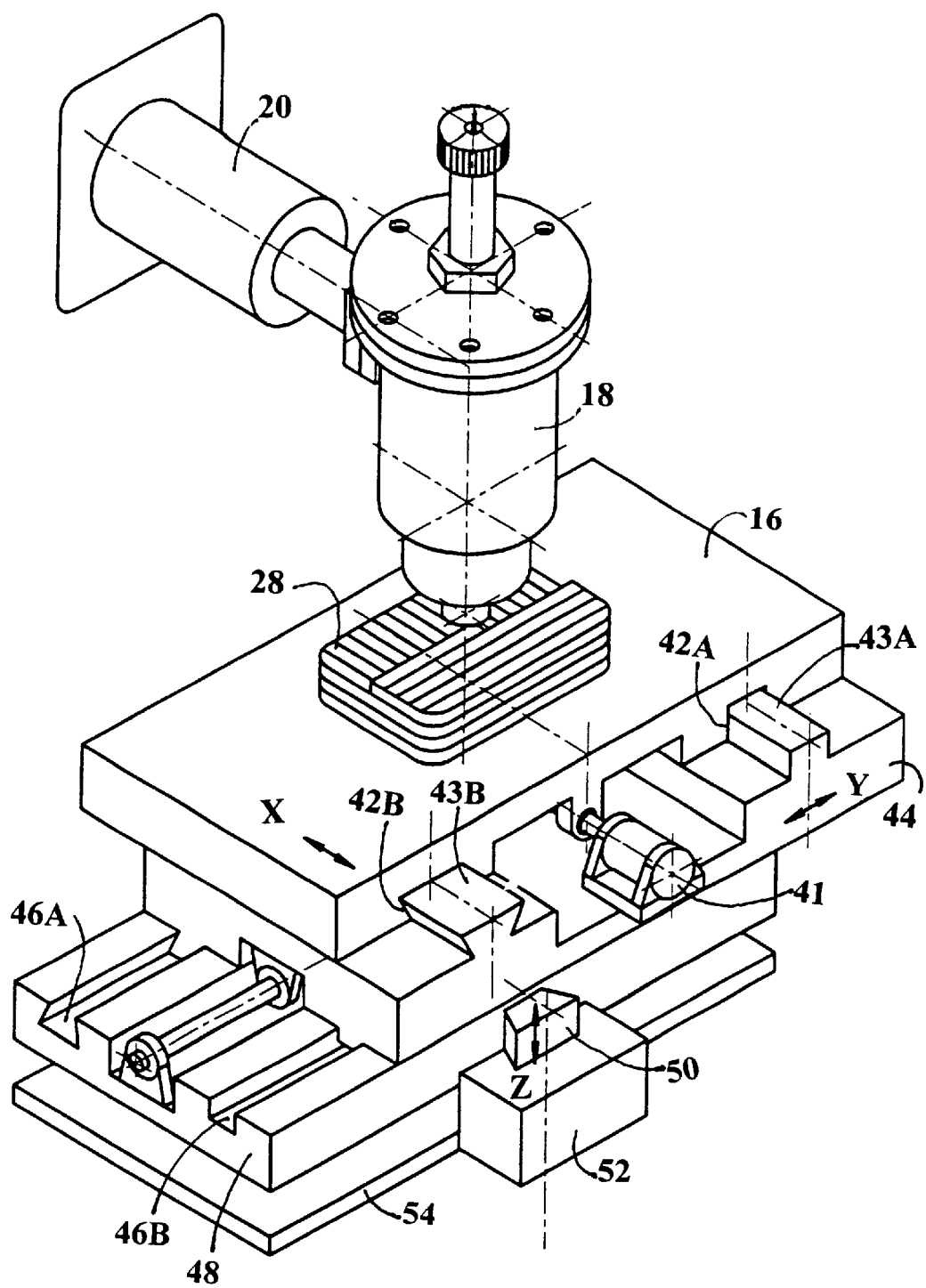
FIG. 1 A perspective view of an apparatus capable of building a 3-D object layer by layer.
Figure 2:
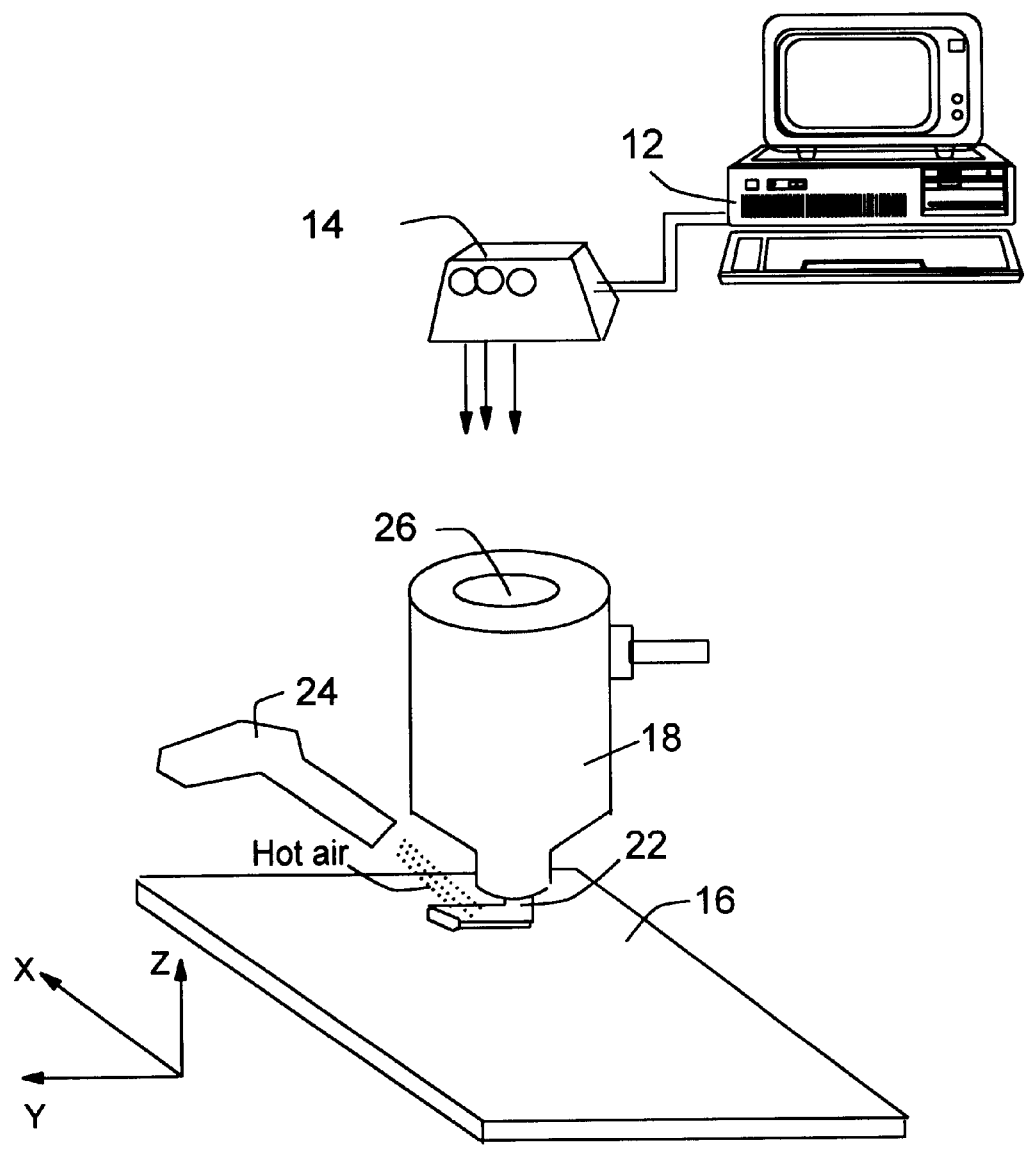
FIG. 2 Schematic of a layer manufacturing system including a material treatment device to rapidly remove at least a portion of the volatile ingredient after a food composition is dispensed out of a nozzle.

FIGS. 1 and 2 illustrate one preferred embodiment of the presently invented method for making a three-dimensional (3-D) food object. This method begins with creation of a computer-aided design (a drawing, image, geometry representation) of a three-dimensional object using a computer. This method further involves the operation of a system that includes computer software and control hardware (e.g., motion controller/indexer 14). The system includes a support member 16 by which the object is supported while being constructed. The system also has a food dispensing head 18 for dispensing a strand 22 of food composition in a fluent state. This food composition includes a volatile ingredient that helps to make the food composition in a flowable state while still residing in a chamber 26 of the food dispensing head 18. The food composition in this chamber is supplied, intermittently or continuously, from a material delivery means 20 such as a screw extruder, gear pump, metering pump, positive displacement valve, solenoid-controlled valve, and air pump (pneumatically operated pump).

The method further includes operating a material treatment device (e.g., a hot air blower 24) disposed near the strand 22 of food composition being dispensed for removing the volatile ingredient to cause the food composition to rapidly achieve a rigid state in which the food composition is built up in a form of this 3-D object. The method also includes operating a computer 12 for generating control signals in response to coordinates of the design of this object and operating the controller/indexer 14 for controlling the position of the dispensing head relative to the support member in response to the control signals. During the steps of moving the dispensing head relative to the support member, the dispensing head 18 is also controlled to dispense the food composition, continuously or intermittently, for constructing a 3-D shape of the object 28 while supported with the support member 16. Specifically, the dispensed food composition is deposited in multiple layers which adhere to one another to build up the object.

Figure 3A:
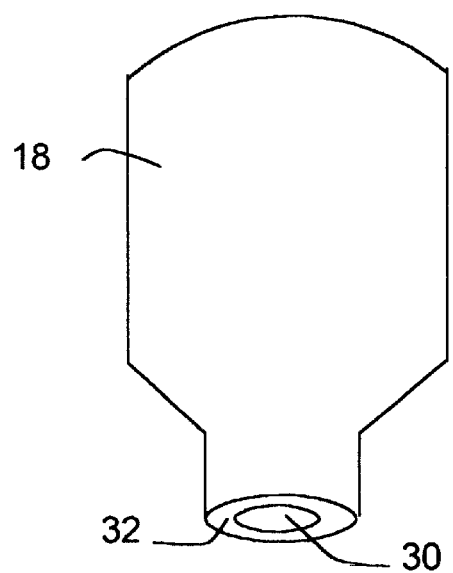
FIG. 3(a) The dispensing head has a flat bottom and an orifice, (b) The gap between the nozzle flat bottom 32 and a preceding layer 36 serves to control the thickness of a new layer being deposited.
Figure 3B:
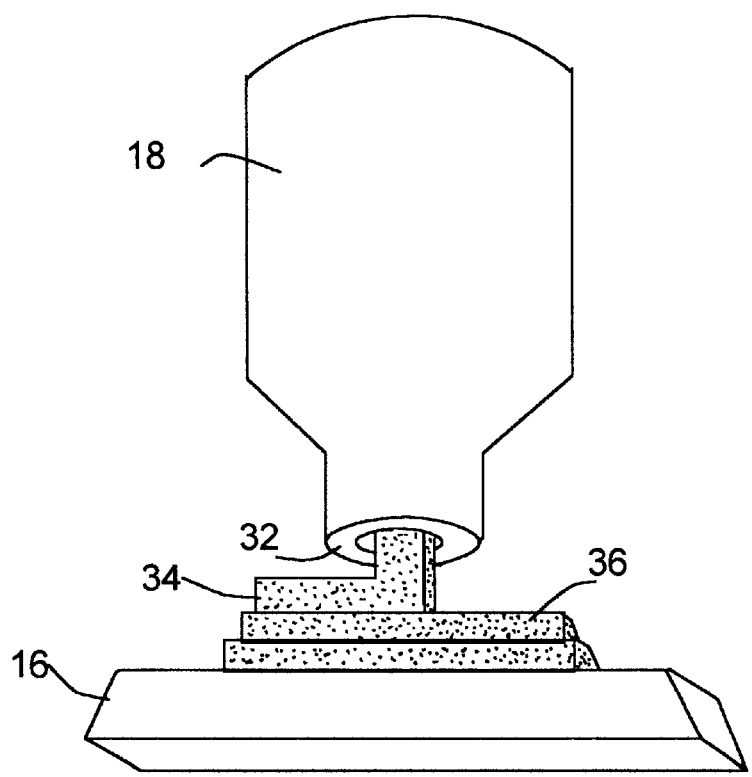

The flowable food composition is composed of a volatile ingredient (in a fluid state), a primary object body-building food material, and other optional additives. This food composition is capable of rapidly achieving a rigid state immediately after being dispensed out of an orifice 30 at the bottom portion 32 of the dispensing head 18 to deposit onto a surface of a moveable support member 16 (FIG. 3). This rapid "rigidization" is made possible by rapidly removing at least a portion of the volatile ingredient from the dispensed food composition. The process begins with the deposition of a first layer (e.g., 38 in FIG. 3b) with part or all of the volatile ingredient removed prior to deposition of a second layer (e.g., 36 in FIG. 3b). The step of removing the volatile ingredient from the first layer could continue when the second and subsequent layers (e.g., 34 in FIG. 3b) are being built. Similarly, the removal of the volatile ingredient from the second layer could continue when the third and subsequent layers are being dispensed and deposited. These steps are repeated until all constituent layers of the 3-D object are deposited. At this moment of time, a portion of volatile ingredient may still remain in the fabricated 3-D shape, which could be subjected to a further treatment at a later stage to remove a desired amount of the volatile ingredient out of the 3-D shape. A food composition is composed of at least a volatile ingredient, at least a primary body-building food material (that can be selected from a group consisting of starch, meat, vegetable, fruit, chocolate, sugar, syrup, salt, butter, margarine, cheese, cream and combinations thereof) and possibly other additives.

Food Compositions: The discharged food composition that comes in contact with the support member or a previous layer must meet two conditions. The first condition is that this composition must have a sufficiently high viscosity to prevent excessive flow (or spreading) when being deposited; this is required in order to achieve a good dimensional accuracy. The second condition is that the newly discharged material must be able to adhere to a previous layer. These two conditions can be met by discharging the following three major types of food compositions and rapidly removing at least a portion of the volatile ingredient therein:

Type I: The food composition of Type 1 contains a primary body-building food material that is soluble in the volatile ingredient: e.g., starch soluble in water. Water keeps the food composition in a fluent state inside the chamber of the dispensing head. Part of water can be rapidly removed after the food composition is discharged out of the orifice. Removal of a portion of water can be facilitated by subjecting the object-building zone to a ventilation treatment (e.g., using a ventilation fan to blow water off or a vacuum pump to pump out water). When a certain amount of water is removed, starch molecules are precipitated out to form a cohesive phase, making the food composition thick and consistent (with a sufficiently high viscosity to become rigid). The body-building material may contain a viscosity enhancing agent (e.g., meat granules) and/or other additives.

EXAMPLE 1

Corn starch (10 grams) was dissolved in approximately 100 cc of water at approximately 60° C. to form a solution. Additional amount of starch (another 10 grams) was added to the solution, which was "swollen", but not totally dissolved in water. This slurry-like food composition was extruded through a syringe-type nozzle to deposit onto a polyethylene-based support member layer by layer. A hair-dryer was used to help remove a portion of water after the slurry was dispensed from the nozzle.

EXAMPLE 2

Corn starch (10 grams) was dissolved in approximately 100 cc of water at approximately 70° C. to form a solution. Approximately 10 grams of finely ground meat granules was added to this solution to increase the consistency (viscosity) of the solution. Such a mixture made a thick paste. This tooth paste-like food composition was extruded through an extrusion-type nozzle to deposit onto a polyethylene-based support member. A hair-dryer was used to help remove a portion of water after the slurry was dispensed from the nozzle.

EXAMPLE 3

Potato starch (10 grams) was dissolved in approximately 100 cc of water and 20 cc of alcohol at approximately 70° C. to form a solution. Additional amount of starch was added to the solution, which was "swollen", but not totally dissolved in this mixture of water and alcohol. This slurry-like food composition was extruded through a syringe-type nozzle to deposit onto a polyethylene-based support member. A hair-dryer was used to help remove a portion of water and most of alcohol after the slurry was dispensed from the nozzle to build a 3-D shape layer by layer. Alcohol was more volatile than water and easier to remove. The incorporation of alcohol accelerated the thickening or rigidization process of the food composition, which was a multi-material mixture.

Type II: The food composition of Type 2 contains a primary body-building material in the form of discrete particles that can be dispersed, but not dissolved in the volatile ingredient, e.g., beacon powder dispersed in water. Water keeps the food composition in a fluent state inside the chamber of a dispensing head. A portion of water can be rapidly removed after the food composition is discharged out of the orifice. Removal of water may be facilitated by subjecting the object-building zone to a ventilation treatment (e.g., using a ventilation fan). When most water is removed, the particles would make the food composition thick and consistent (with a sufficiently high viscosity to become rigid). But, the resulting shape would be very fragile due to a lack of cohesive bonds between individual beacon particles. Therefore, the body-building material preferably contains an edible adhesive (e.g., yam starch) that is dispersed between particles and helps to bond the particles together.

EXAMPLE 4

Baking wheat flour (40 g), sugar (5 g), corn syrup (3 g) and yeast (0.7 g) were mixed in 40 grams of water at 50° C. to form a paste. This paste-like food composition was extruded through a syringe-type nozzle to deposit onto a polyethylene-based support member of a 3-D object maker. A hot air blower was used to help remove a portion of water after the paste was dispensed from the nozzle to form a 3-D shape layer by layer. The sugar, yeast and corn syrup were left behind, residing between wheat flour particles and helping to bond together these particles at least tentatively. The fabricated 3-D shape was further heated in a kitchen oven to activate the baking process.

EXAMPLE 5

A piece of baked cake (approximately 10 grams) was ground in a food processor into a powder form. This cooked cake powder was then dispersed in a mixture of chocolate syrup (10 g), sugar (2 g), alcohol (3 g) and water (5 g) at 50° C. to form a paste. This paste-like food composition was used to serve as cake topping. This mixture was extruded through a syringe-type nozzle to deposit onto a piece of pre-baked cake sitting on top of a wood support member in a 3-D object maker. A hot air blower was used to help remove most of alcohol and a portion of water after the paste was dispensed from the nozzle to form a 3-D intricate-shape topping layer by layer.

Type III. A sol-gel material (e.g., an edible natural polymer gel composed of a lightly cross-linked network of chains with small molecules occupying interstices between these chains). These small molecules can be a highly volatile liquid like ethanol or moderately volatile liquid like warm water. The sol-gel can be formulated to have proper flowability inside the food composition-hosting chamber of a nozzle. The volatile liquid may be rapidly removed partially to increase the viscosity and rigidity of the dispensed sol-gel material. Concurrently or sequentially, the gelation process of the food composition after being discharged onto the support member or a previous layer may be advanced further to increase its viscosity to facilitate the rigidization process.

EXAMPLE 6

A variety of natural polymer powders, such as lotus root and corn starch, may be well dispersed in warm water to produce a paste for being readily transported to a dispensing head. For instance, a tea spoon of lotus root powder containing approximately 10% by weight sugar was added to a cup (approximately 10 cc) of warm water at 50° C. Additional water at a higher temperature (95–100° C.) was then added just prior to the discharging step to activate the fast gelation process. A hot air blower was used to accelerate the water vaporization process after the mixture was discharged from the dispensing head to construct a 3-D object layer by layer. This food composition was naturally glued to a previous layer, yet would not flow to any significant extent in this highly gelled state.

Processes and Needed Hardware: The process involves intermittently or continuously dispensing the fluent food composition through an orifice 30 of a dispensing head 18 to deposit onto a surface of a support member 16. During this dispensing procedure, the support member and the dispensing head are moved (preferably under the control of a computer 12 and a controller/indexer 14) with respect to each other along selected directions in a predetermined pattern on an X-Y plane defined by first (X-) and second (Y-) directions and along the Z-direction perpendicular to the X-Y plane. The three mutually orthogonal X-, Y- and Z-directions form a Cartesian coordinate system. These relative movements are effected so that the food composition can be deposited essentially point by point and layer by layer to build a multiple-layer object according to a computer-aided design (CAD) drawing of a 3-D object.

In a preferred embodiment, the bottom (e.g., 32 in FIG. 3a) of the dispensing head 18 is made to be flat so that this flat portion acts like a "doctor's blade" to slightly compress down the food composition when being discharged from the orifice against the substrate. The word "substrate" in the present context refers to the surface of the support member when the first layer is being built or to the surface of the immediate preceding layer when the second or subsequent layers are being deposited. The gap between the substrate and this doctor's blade is preferably made to be slightly smaller than the diameter of the strand of food composition being dispensed. This would help to produce a layer with a smooth surface.

In one preferred embodiment, an optional heating provision (e.g., heating elements) is attached to, or contained in, the nozzle to control the physical and chemical state of the food composition; e.g., to help maintain it in a fluent state.

A temperature sensing means (e.g. a thermocouple) and a temperature controller can be employed to regulate the temperature of the nozzle. Heating means are well known in the art.

Advantageously, the dispensing head may be designed so that the discharge orifice can be readily removed and replaced with another orifice of a different size. Such an adjustable tip is desirable because an operator may choose to use different food compositions to build portions of an object or different components.

Referring again to FIG. 1, the support member 16 is located in close, working proximity to, but at a predetermined initial distance from, the dispensing head 18. The upper surface of the support member preferably has a flat region sufficiently large to accommodate the first few layers of deposited food composition. The support member and the dispensing head are equipped with mechanical drive means for moving the support member relative to the movable dispensing head in three dimensions along "X," "Y," and "Z" axes in a predetermined sequence and pattern, and for displacing the nozzle a predetermined incremental distance relative to the base member. This can be accomplished, for instance, by allowing the support member and the dispensing head to be driven by three linear motion devices powered by three separate stepper motors.

As an example, schematically shown in FIG. 1 is a support member with two slots 42A,42B extending along the "X" axis and being guided by two corresponding tracks 43A,43B of a supporting base plate 44. A stepper motor 41, attached to said supporting base plate 44, is employed to move the support member 16 along the "X" axis. The supporting base plate 44 is, in turn, provided with a second linear motion mechanism, driven by a second stepper motor to provide movements along the "Y" axis. For instance, the supporting base member 44 can be directed to slide on two parallel slots 46A,46B, extending along the "Y" axis, of another reversibly slidable base plate 48. This supporting base plate 48 is further provided with another drive means to provide "Z"-axis movements. Any similarly configured mechanical means can be utilized to move the base plate 48 reversibly in the vertical direction (along the "Z" axis). Simplistically shown at the lower portion of FIG. 1 is a protruded rail 50 (attached to, or integral with, base plate 48), which slides vertically on a "Z"-axis slot of a post 52. The post is connected to or integral with a sturdy base 54. Z-axis movements are effected to displace the nozzle relative to the support member and, hence, relative to each layer deposited prior to the start of the formation of each successive layer. This will make it possible to form multiple layers of material composition of predetermined thickness, which build up on each other sequentially as the material composition solidifies after being discharged from the orifice. Instead of stepper motors, many other types of drive means can be used, including linear motors, servo motors, synchronous motors, D.C. motors, and fluid motors.

As another preferred embodiment of the present invention, the apparatus used for the process may comprise a plurality of dispensing heads each having flow-passage means (chamber or channel) therein connected to a dispensing orifice at one end thereof. Each additional nozzle is provided with a separate supply of a different food composition, and means for introducing this food composition into the flow-passage so that the food composition is in a fluent state just prior to discharge.

Another embodiment of the present invention involves using a multiple-nozzle apparatus as just described.

However, at least one nozzle is supplied with a material for depositing a support structure for supporting those features of the 3-D object that cannot support themselves (e.g., overhangs and isolated islands). The support material used may be another food composition that, if necessary, can be easily removed at a later stage.

Figure 4:
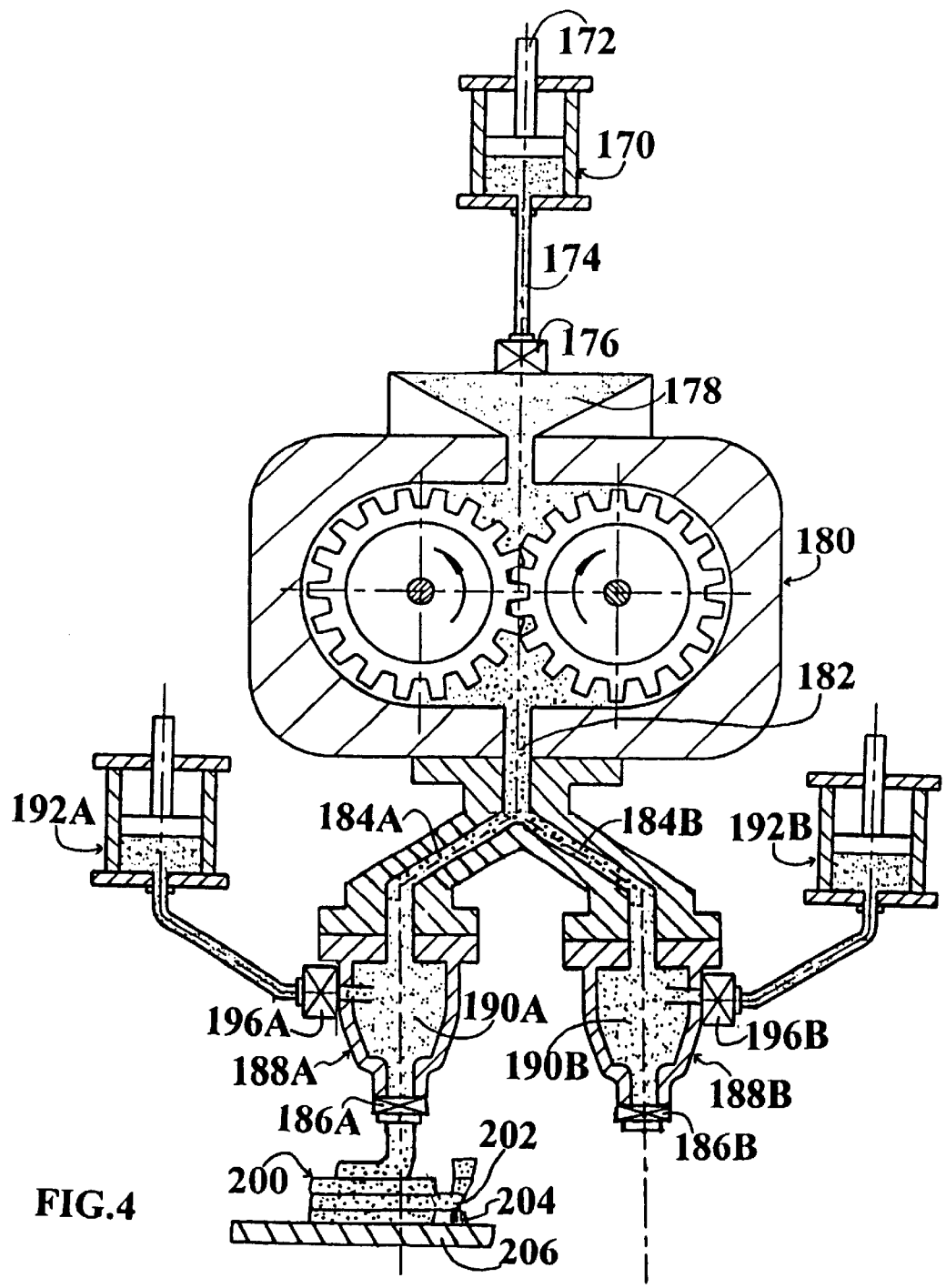
FIG. 4 A dispensing head having a plurality of nozzles.

An example of such a multiple-nozzle apparatus is schematically shown in FIG. 4, wherein a food composition is introduced into a container 170, optionally pushed by a pressurizing means 172, to pass through a channel 174 and a regulating valve 176 and enter a chamber 178. In this chamber, the food composition is allowed to be pumped by a metering gear pump 180 to enter a flow passage 182. The fluid flow is then split into multiple channels 184A, 184B, each leading into a nozzle 188A or 188B. Each additional nozzle may comprise flow-passage means 190A or 190B, a tip with a discharge orifice of a predetermined size therein, and valve means 186A or 186B, preferably disposed near the tip. Each additional nozzle may be provided with a separate supply of colorant-containing materials from a container 192A or 192B through valve means 196A or 196B into the passage 190A or 190B, where the colorant is mixed with the food composition delivered from the gear pump 180. It may be noted that each additional nozzle may be in flow-communication with more than one colorant-feeding channel. Each nozzle may take turn to deposit a material of a different color to build a portion of the object 200 supported by a platform 206. A support structure 204 is built to support an unsupported feature 202 (e.g., the bottom part of a cup handle shape member). This example is presented to illustrate how different food compositions or substantially the same composition but of different colors may be dispensed to form a multi-color food object. Edible colorants are commercially available.

There are many commercially available metering and dispensing nozzles that are capable of dispensing the food compositions in the presently invented method. Examples include various two-component dispensing devices such as PosiDot® from Liquid Control Corp. (7576 Freedom Ave., North Canton, Ohio) and Series 1125 Meter-Mix-Dispense systems from Ashby-Cross Company, Inc. (418 Boston Street, Topsfield, Mass.). Any of such prior art dispensing nozzles can be incorporated as a part of the dispensing head used in the presently invented method to deposit food compositions when and where needed.

Computer-Aided Design and Process Control

Figure 5:
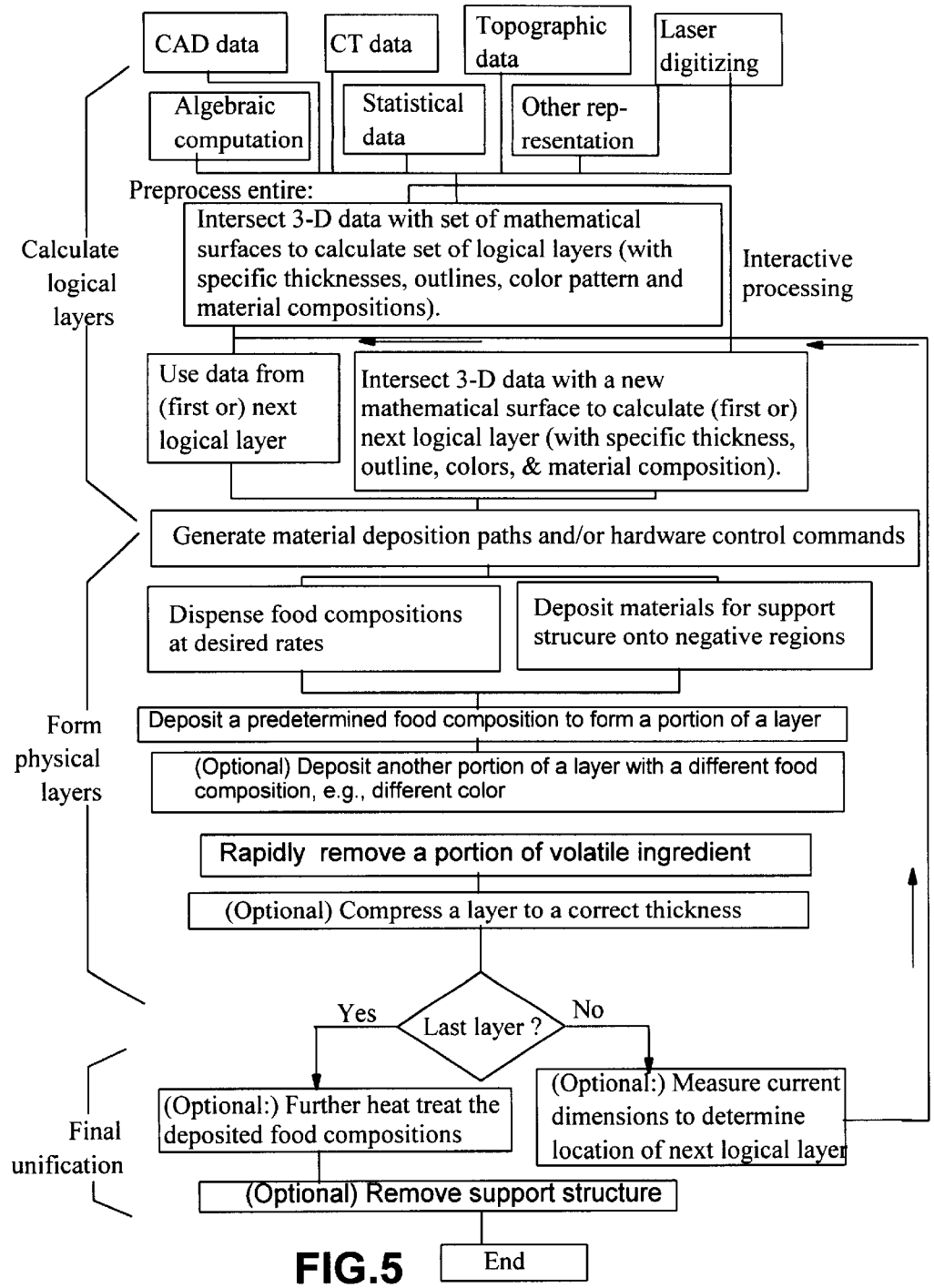
FIG. 5 A flow chart showing the sequence of creating the 3-D object by a CAD software program, establishing layer-by-layer database by layering software, and sending out motion-controlling signals by a computer to the drive motors through a motion controller.

A preferred embodiment of the present invention is a solid freeform fabrication process in which the execution of various steps may be illustrated by the flow chart of FIG. 5. The process begins with the creation of a mathematical model (e.g., via computer-aided design, CAD), which is a data representation of a 3-D object. This model is stored as a set of numerical representations of layers which, together, represent the whole object. A series of data packages, each data package corresponding to the physical dimensions and shape of an individual layer, is stored in the memory of a computer in a logical sequence.

In one preferred approach, before the constituent layers of a 3-D object are formed, the geometry of this object is logically divided into a sequence of mutually adjacent theoretical layers, with each theoretical layer defined by a thickness and a set of closed, nonintersecting curves lying in a smooth two-dimensional (2-D) surface. These theoretical layers, which exist only as data packages in the memory of the computer, are referred to as "logical layers." This set of curves forms the "contour" of a logical layer or "cross section". In the simplest situation, each 2-D logical layer is a plane so that each layer is flat, and the thickness is the same throughout any particular layer. However, this is not necessarily so in every case, as a layer may have any desired curvature and the thickness of a layer may be a function of position within its two-dimensional surface. The only constraint on the curvature and thickness function of the logical layers is that the sequence of layers must be logically adjacent. Therefore, in considering two layers that come one after the other in the sequence, the mutually abutting surfaces of the two layers must contact each other at every point, except at such points of one layer where the corresponding point of the other layer is void of material as specified in the object model.

As summarized in the top portion of FIG. 5, the data packages for the logical layers may be created by any of the following methods:

(1) For a 3-D computer-aided design (CAD) model, by logically "slicing" the data representing the model, (2) For topographic data, by directly representing the contours of the terrain, (3) For a geometrical model, by representing successive curves which solve "z=constant" for the desired geometry in an x-y-z rectangular coordinate system, and (4) Other methods appropriate to data obtained by computer tomography (CT), magnetic resonance imaging (MRI), satellite reconnaissance, laser digitizing, line ranging, or other reverse engineering methods of obtaining a computerized representation of a 3-D object.

An alternative to calculating all of the logical layers in advance is to use sensor means to periodically measure the dimensions of the growing object as new layers are formed, and to use the acquired data to help in the determination of where each new logical layer of the object should be, and possibly what the curvature and thickness of each new layer should be. This approach, called "adaptive layer slicing", could result in more accurate final dimensions of the fabricated object because the actual thickness of a sequence of stacked layers may be different from the simple sum of the intended thicknesses of the individual layers.

The closed, nonintersecting curves that are part of the representation of each layer unambiguously divide a smooth two-dimensional surface into two distinct regions. In the present context, a "region" does not mean a single, connected area. Each region may consist of several island-like subregions that do not touch each other. One of these regions is the intersection of the surface with the desired 3-D object, and is called the "positive region" of the layer. The other region is the portion of the surface that does not intersect the desired object, and is called the "negative region." The curves that demarcate the boundary between the positive and negative regions are called the "outline" of the layer. In the present context, the material composition is allowed to be deposited in the "positive region" while, optionally, a wax or a low-melting material may be deposited in certain parts or all of the "negative region" in each layer to serve as a support structure.

As a specific example, the geometry of a three-dimensional object may be converted into a proper format utilizing commercially available CAD/Solid Modeling software. A commonly used format is the stereo lithography file (.STL), which has become a defacto industry standard for rapid prototyping. The object image data may be sectioned into multiple layers by a commercially available software program. Each layer has its own shapes and dimensions, which define both the positive region and the negative region. These layers, each being composed of a plurality of segments, when combined together, will reproduce a shape of the intended object.

In one embodiment of the present invention, the method involves depositing an easily removable material in all of the negative regions in each layer to serve as a support structure. This support structure may be removed at a later stage or at the conclusion of the object-building process. The presence of a support structure (occupying the negative region of a layer), along with the object-building material (the positive region), will completely cover a layer before proceeding to build a subsequent layer.

As another embodiment of the present invention, the 3-D object making process comprise additional steps of (1) evaluating the data files of the CAD drawing representing the intended object to locate any un-supported feature of the object and (2) responsive to this evaluation step, determining a support structure for the un-supported feature. This can be accomplished by, for instance, (a) creating a plurality of segments defining the support structure, (b) generating programmed signals corresponding to each of the segments defining this support structure in a predetermined sequence; and (c) operating a separate material deposition device, in response to these programmed signals for building the support structure.

When a multi-material or multi-color object is desired, these segments are preferably sorted in accordance with their material compositions or colors. This can be accomplished by taking the following procedure: When the stereo lithography (.STL) format is utilized, the geometry is represented by a large number of triangular facets that are connected to simulate the exterior and interior surfaces of the object. The triangles may be so chosen that each triangle covers one and only one material composition or color. In a conventional .STL file, each triangular facet is represented by three vertex points each having three coordinate points, $(x_1,y_1,z_1)$, $(x_2,y_2,z_2)$ and $(x_3,y_3,z_3)$, and a unit normal vector $(i,j,k)$. Each facet is now further endowed with a material composition or color code to specify the desired food ingredient or colorant. This geometry representation of the object is then sliced into a desired number of layers expressed in terms of any desired layer interface format (such as Common Layer Interface or CLI format). During the slicing step, neighboring data points with the same material composition or color code on the same layer may be sorted together. These segment data in individual layers are then converted into programmed signals (data for selecting dispensing heads and tool paths) in a proper format, such as the standard NC G-codes commonly used in computerized numerical control (CNC) machinery industry. These layering data signals may be directed to a machine controller which selectively actuates the motors for moving the dispensing head with respect to the support member, activates signal generators, drives the food material supply means (if existing) for the dispensing head, drives the optional vacuum pump means, and operates optional if temperature controllers, etc. It should be noted that although .STL file format has been emphasized in this paragraph, many other file formats have been employed in different commercial rapid prototyping and manufacturing systems. These file formats may be used in the presently invented system and each of the constituent segments for the object geometry may be assigned a material composition code if an object of different material compositions or colors at different portions is desired.

The three-dimensional motion controller is electronically linked to the mechanical drive means and is operative to actuate the mechanical drive means (e.g., those comprising stepper motors in FIG. 1) in response to "X", "Y", "Z" axis drive signals for each layer received from the CAD computer. Controllers that are capable of driving linear motion devices are commonplace. Examples include those commonly used in a milling machine.

Numerous software programs have become available that are capable of performing the presently specified functions. Suppliers of CAD/Solid Modeling software packages for converting CAD drawings into .STL format include SDRC (Structural Dynamics Research Corp. 2000 Eastman Drive, Milford, Ohio 45150), Cimatron Technologies (3190 Harvester Road, Suite 200, Burlington, Ontario L7N 3N8, Canada), Parametric Technology Corp. (128 Technology Drive, Waltham, Mass. 02154), and Solid Works (150 Baker Ave. Ext., Concord, Mass. 01742). Optional software packages may be utilized to check and repair .STL files which are known to often have gaps, defects, etc. AUTOLISP can be used to convert AUTOCAD drawings into multiple layers of specific patterns and dimensions.

Several software packages specifically written for rapid prototyping have become commercially available. These include (1) SOLIDVIEW RP/MASTER software from Solid Concepts, Inc., Valencia, Calif.; (2) MAGICS RP software from Materialise, Inc., Belgium; and (3) RAPID PROTOTYPING MODULE (RPM) software from Imageware, Ann Arbor, Mich. These packages are capable of accepting, checking, repairing, displaying, and slicing .STL files for use in a solid freeform fabrication system. MAGICS RP is also capable of performing layer slicing and converting object data into directly useful formats such as Common Layer Interface (CLI). A CLI file normally comprises many "polylines" with each polyline being an ordered collection of numerous line segments. These and other software packages (e.g. Bridgeworks from Solid Concepts, Inc.) are also available for identifying an un-supported feature in the object and for generating data files that can be used to build a support structure for the un-supported feature. The support structure may be built by a separate fabrication tool or by the same dispensing head that is used to build the object.

A company named CGI (Capture Geometry Inside, currently located at 15161 Technology Drive, Minneapolis, Minn.) provides capabilities of digitizing complete geometry of a three-dimensional object. Digitized data may also be obtained from computed tomography (CT) and magnetic resonance imaging (MRI), etc. These digitizing techniques are known in the art. The digitized data may be re-constructed to form a 3-D model on the computer and then converted to .STL files. Available software packages for computer-aided machining include NC Polaris, Smartcam, Mastercam, and EUCLID MACHINIST from MATRA Datavision (1 Tech Drive, Andover, Mass. 01810).

Another preferred embodiment of the present invention is a method for making a 3-D object as defined in any of the above-described processes, yet with the following additional specifications: (a) the discharge orifice tip of the nozzle has a substantially planar bottom surface being maintained at a predetermined gap distance from the support member, (b) the planar bottom surface of the tip is maintained substantially parallel to both the first layer and the plane of the support member while a second layer of food composition is being deposited onto the first layer from the orifice. These two requirements are specified so that the planar bottom surface of the orifice tip provides a shearing effect on the top surface of the second layer to thus closely control the absolute location of successive layers with respect to the support member. The orifice acts essentially like a "doctor's blade". This action also serves to avoid any accumulative error in layer build-up, and to maintain a smooth layer surface.

Sensor means may be attached to proper spots of the support member or the material dispensing head to monitor the dimensions of the physical layers being deposited. The data obtained are fed back periodically to the computer for re-calculating new layer data. This option provides an opportunity to detect and rectify potential layer variations; such errors may otherwise cumulate during the build process, leading to significant part inaccuracy. Many prior art dimension sensors may be selected for use in the present apparatus.

As indicated earlier, the most popular file format used by all commercial rapid prototyping machines is the .STL format. The .STL file format describes a CAD model's surface topology as a single surface represented by triangular facets. By slicing through the CAD model simulated by these triangles, one would obtain coordinate points that define the boundaries of each cross section. It is therefore convenient for a dispensing head to follow these coordinate points to trace out the perimeters (peripheral contour lines) of a layer cross section. These perimeters may be built with selected food composition patterns. These considerations have led to the development of another embodiment of the present invention. This is a method as set forth in the above-cited process, wherein the moving step includes the step of moving the dispensing head and the support member relative to one another in a direction parallel to the X-Y plane according to a first predetermined pattern to form an outer boundary of one selected food composition or a distribution pattern of different food compositions onto the support member. The outer boundary defines an exterior surface of the object.

Another embodiment is a process as set forth in the above paragraph, wherein the outer boundary defines an interior space in the object, and the moving step further includes the step of moving the dispensing head and the support member relative to one another in one direction parallel to the X-Y plane according to at least one other predetermined pattern to partially or completely fill this interior space with a selected food composition. The interior space does not have to have the same food material composition as the exterior boundary. The interior space may be built with food compositions of a spatially controlled material composition comprising one or more distinct types of ingredients. The food compositions may be deposited in continuously varying concentrations of distinct types of materials. This method may further comprise the steps of (1) creating a geometry of the object on a computer with the geometry including a plurality of segments defining the object and material compositions to be used; and (2) generating program signals corresponding to each of these segments in a predetermined sequence, wherein the program signals determine the movement of the dispensing head and the support member relative to one another in the first predetermined pattern and at least one other predetermined pattern.

At the conclusion of 3-D shape formation process, it is possible that some of the volatile ingredient still remains in this shape. The present method may include additional steps of further removing a portion or a majority of the residual volatile ingredient after the shape is constructed. In some cases, the starting material composition may contain un-activated materials such as wheat flour and yeast or baking powder. Hence, the resulting 3-D shape may not be ready for consumption. The method then could further include additional steps of heat treating (e.g., baking) the shape to become an edible food object.

We claim:

1. A freeform fabrication method for making a three-dimensional food object from a design created on a computer, comprising:

(a) providing a support member by which said object is supported while being constructed;

(b) operating a material dispensing head for dispensing a strand of a food composition in a fluent state, said food composition comprising a volatile ingredient and a primary body-building food material;

(c) operating a material treatment means disposed a distance from said strand of food composition to remove at least a portion of said volatile ingredient for causing said food composition to achieve a rigid state in which said food composition is capable of supporting its own weight while built up in a form of said three-dimensional object; and (d) operating control means for generating control signals in response to coordinates of said design of said object created on the computer and controlling the position of said dispensing head relative to said support member in response to said control signals to control dispensing of said food composition to construct said object while supported with said support member.

2. The method of claim 1 wherein said material treatment means is selected from the group consisting of a ventilation fan, a vacuum pump, a hot air blower, a radiant heater, and combinations thereof.

3. The method of claim 1 wherein said dispensing head receives said food composition from an extrusion device selected from the group consisting of an extruder, a metering pump, a positive displacement valve, an pneumatically operated valve, a solenoid-controlled valve, and combinations thereof.

4. The method of claim 1 wherein said control means include servo means for indexing and positioning said dispensing head relative to said support member.

5. The method of claim 4 wherein said servo means provide indexing and positioning in at least two dimensions.

6. The method of claim 1 wherein said support member comprises a pre-fabricated food base member onto which said 3-D food object is being deposited.

7. The method of claim 1 wherein said dispensing head includes an orifice through which said strand of food composition is dispensed and controlled to have a prescribed cross-sectional profile in accordance with the object being constructed.

8. The method of claim 1 wherein said dispensing head includes profile control means through which said food composition is dispensed in a generally continuous strand and by which a continuous strand profile of said strand is controlled according to the object being constructed.

9. The method of claim 1 wherein said food composition comprises a volatile ingredient selected from the group consisting of water, ethanol, vinegar, and combinations thereof.

10. The method of claim 1 wherein said food composition comprises a primary object-building food material selected from the group consisting of starch, meat, vegetable, fruit, chocolate, sugar, syrup, salt, butter, margarine, cheese, cream, and combinations thereof.

11. The method of claim 10 wherein said primary object-building food material contains wheat flour dispersed in said volatile ingredient.

12. The method of claim 10 wherein said primary object-building food material contains a starch dissolved in said volatile ingredient.

13. The method of claim 10 wherein said food composition comprises a colorant.

14. The method of claim 1 wherein said dispensing head has an orifice at a generally flat bottom portion of said dispensing head and said flat bottom portion compresses down and deforms said strand of food composition when being dispensed from said orifice to produce a layer having a flat and smooth surface layer.

15. The method of claim 1, wherein said food composition comprises a cooked food material.

16. The freeform fabrication method of claim 1, wherein said steps of operating a material dispensing head and operating control means comprising moving said dispensing head and said support member relative to one another in a plane defined by first and second directions and in a third direction orthogonal to said plane to form said food composition into a three-dimensional object.

17. The freeform fabrication method of claim 16, wherein said primary body-building food material composition comprises discrete particles and an edible adhesive composition which are both dispersed in said volatile ingredient; said adhesive composition can be later activated to bond said discrete particles together.

18. The freeform fabrication method of claim 16, wherein said primary body-building food material composition comprises starch dissolved in said volatile ingredient in such a manner that the molecules of said starch precipitate out cohesively to form a rigid material.

19. The freeform fabrication method of claim 16, wherein said food composition includes a sol-gel material containing said volatile ingredient.

20. The freeform fabrication method of claim 16, wherein said food composition includes at least two volatile ingredients.

21. The freeform fabrication method of claim 16, wherein an additional dispensing head is used to deposit a support structure for an un-supported feature of said object.

22. The freeform fabrication method of claim 16, wherein said moving step includes the steps of moving said dispensing head and said support member relative to one another in a direction parallel to said plane to form a first layer of said food composition on said support member with a portion of said volatile ingredient being removed immediately after said food composition is dispensed, moving said dispensing head and said support member away from one another in said third direction by a predetermined layer thickness distance, and dispensing a second layer of said food composition onto said first layer and removing a portion of said volatile ingredient from said food composition while simultaneously moving said dispensing head and said support member in said direction parallel to said plane, whereby said second layer adheres to said first layer.

23. The freeform fabrication method of claim 22, further including the steps of forming multiple layers of said food composition on top of one another by repeated dispensing of said food composition and at least partially removing said volatile ingredient in said dispensed food composition as said dispensing head and said support member are moved relative to one another in one direction parallel to said plane, with said dispensing head and said support member being moved away from one another in said third direction by a predetermined layer thickness after each preceding layer has been formed.

24. The freeform fabrication method of claim 16, further including the steps of:
creating a geometry representation of said three-dimensional object on a computer, said
geometry representation including a plurality of segments defining said object; generating programmed signals corresponding to each of said segments in a predetermined sequence; and
moving said dispensing head and said support member relative to one another in response to said programmed signals.

25. The freeform fabrication method of claim 16, wherein said moving step includes the step of moving said dispensing head and said support member relative to one another in a direction parallel to said plane according to a first determined pattern to form an outer boundary of said food composition on said support member, said outer boundary defining an exterior surface of said object.

26. The freeform fabrication method of claim 25, wherein said outer boundary defines an interior space in said object, and said moving step further includes the step of moving said dispensing head and said support member relative to one another in said direction parallel to said plane according to at least one other predetermined pattern to fill said interior space with said food composition.

27. The freeform fabrication method of claim 25, further including operating another dispensing head for dispensing a different food material composition, and wherein said outer boundary defines an interior space in said object, and said moving step further includes the step of moving said another dispensing head and said support member relative to one another in one direction parallel to said plane according to at least one other predetermined pattern to fill said interior space with said different food material composition.

28. The freeform fabrication method of claim 26, further comprising the steps of creating a geometry representation of said three-dimensional object on a computer, said geometry representation including a plurality of segments defining said object, and generating programmed signals corresponding to each of said segments in a predetermined sequence, wherein said programmed signals determine said movement of said dispensing head and said support member relative to one another in said first predetermined pattern and said at least one other predetermined pattern.

29. The freeform fabrication method of claim 1 wherein the steps of operating a material dispensing head including dispensing a strand of a first food composition comprising a volatile ingredient in a fluent state to a predetermined location above said support member and dispensing a second strand of a second food composition comprising a volatile ingredient in a fluent state to at least another location above said support member;
said step of operating a material treatment means including removing at least a portion of said volatile ingredient in said second food composition; and
said first and second strands of food compositions, once dispensed and with said volatile ingredients at least partially removed, rapidly reaching a physical state of a rigidity and strength sufficient for permitting said food compositions to be self-supporting while being built up layer by layer into a three-dimensional shape in a non-solid state; and
during said dispensing step, moving said dispensing head and said support member relative to one another in a plane defined by first and second directions and in a third direction orthogonal to said plane to form said first and second food compositions into a three-dimensional shape of said object.

30. The method of claim 16, further including an additional step of substantially completely removing said volatile ingredient after said object is constructed.

31. The method of claim 29, further including an additional step of substantially completely removing said volatile ingredient after said object is constructed.

32. The method of claim 16, further including additional step of applying a heat treatment to said constructed three-dimensional shape.

33. The method of claim 29, further including additional step of applying a heat treatment to said constructed three-dimensional shape.

34. The method as set forth in claim 26 wherein said interior space is deposited with a spatially controlled food composition comprising two or more distinct types of body-building food materials.

35. The method as set forth in claim 26 wherein said interior space is deposited with a food composition in continuously varying concentrations of distinct materials in three-dimensional object space to form a spatially controlled food composition object.

36. The method as set forth in claim 34 wherein said distinct types of materials are deposited at discrete locations in three-dimensional part space to form a spatially controlled food material composition object.

37. The method as set forth in claim 16, further comprising periodically measuring dimensions of the object being built by means of dimension sensor means;

determining the thickness and outline of individual layers of said food composition deposited in accordance with a computer aided design representation of said object; said computer being operated to calculate a first set of logical layers with specific thickness and outline for each layer and then periodically re-calculate another set of logical layers after comparing the dimension data acquired by said sensor means with said computer aided design representation in an adaptive manner.

* * * * *